US009552485B1

(12) United States Patent
Cignetti et al.

(10) Patent No.: US 9,552,485 B1
(45) Date of Patent: *Jan. 24, 2017

(54) CRYPTOGRAPHIC MATERIAL RENEWAL

(71) Applicant: Amazon Technologies, Inc., Seattle, WA (US)

(72) Inventors: Todd Lawrence Cignetti, Ashburn, VA (US); Andrew Jeffrey Doane, Vienna, VA (US); Stefan Popoveniuc, Alexandria, VA (US); Matthew Allen Estes, Herndon, VA (US); Alexander Edward Schoof, Herndon, VA (US); Robert Eric Fitzgerald, Herndon, VA (US); Peter Zachary Bowen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,168

(22) Filed: Oct. 21, 2014

(51) Int. Cl.
*H04L 29/06* (2006.01)
*G06F 21/60* (2013.01)
*H04L 9/32* (2006.01)

(52) U.S. Cl.
CPC ........... *G06F 21/602* (2013.01); *H04L 9/3263* (2013.01)

(58) Field of Classification Search
CPC .................................................... H04L 9/3263
USPC ......................................................... 713/156
See application file for complete search history.

(56) References Cited

U.S. PATENT DOCUMENTS

| | | | | |
|---|---|---|---|---|
| 9,032,473 B2* | 5/2015 | Guccione | .............. | H04L 63/102 709/224 |
| 2004/0162786 A1* | 8/2004 | Cross | ...................... | G06F 21/33 705/59 |
| 2005/0138386 A1* | 6/2005 | Le Saint | .......... | G06Q 20/38215 713/185 |
| 2006/0236096 A1* | 10/2006 | Pelton | ..................... | H04L 63/06 713/155 |
| 2014/0164776 A1* | 6/2014 | Hook | ........................ | H04L 9/14 713/171 |
| 2014/0173688 A1* | 6/2014 | Fischer | .............. | G05B 19/0428 726/1 |
| 2014/0230007 A1* | 8/2014 | Roth | ..................... | G06F 21/602 726/1 |
| 2015/0222604 A1* | 8/2015 | Ylonen | ................. | H04L 63/062 713/171 |

* cited by examiner

*Primary Examiner* — Morshed Mehedi
*Assistant Examiner* — Khalil Naghdali
(74) *Attorney, Agent, or Firm* — Davis Wright Tremaine LLP

(57) ABSTRACT

A method and apparatus for renewing cryptographic material are disclosed. In the method and apparatus a cryptographic material renewal entity of a computing resource service provider detects that cryptographic material stored by a secure module is to be renewed. Renewing the cryptographic material may include rekeying a private key associated with a certificate. Further, a digital certificate may be renewed, and the renewed certificate may be provided for use by the computing resource. The cryptographic material is used to fulfill requests made by a computing resource provisioned by the computing resource service provider for a customer. The renewed cryptographic material is provided to the secure module, whereby the renewed cryptographic material is used by the secure module to fulfill further requests made by the computing resource.

17 Claims, 13 Drawing Sheets

CRYPTOGRAPHIC MATERIAL RENEWAL

CROSS-REFERENCE TO RELATED APPLICATIONS

This application incorporates by reference for all purposes the full disclosure of: co-pending U.S. patent application Ser. No. 14/520,048, filed concurrently herewith, entitled "CRYPTOGRAPHIC MATERIAL DISTRIBUTION AND MANAGEMENT."

BACKGROUND

The use of remote computing resources has proliferated in recent years. The resources for remote computing are often provided by computing resource service providers who leverage large-scale networks of computers, servers and storage drives to enable customers, including organizations of various sizes, to host and execute a variety of applications and services. Customers, who traditionally used on-premises computing resources often forego on-premises computing and turn to using the computing resources of the computing resource providers. The usage of network computing allows customers to efficiently and adaptively satisfy their computing needs, whereby the computing resources may be added or removed from a large pool provided by the computing resource provider on an on-demand basis.

It is important to enable the computing resources provided by a services provider to communicate securely with other computing resources within or outside of the provider's networks, whereby the secure communication may be performed using cryptographic techniques. Accordingly, it is often challenging to distribute cryptographic material that is used for securing communications to computing resources provided by a service provider and ensure that the cryptographic material is safely stored without exposure or compromise. Furthermore, it is also challenging to ensure that the cryptographic material is renewed and updated so as to enable computing resources to securely communicate without interruption.

BRIEF DESCRIPTION OF THE DRAWINGS

Various embodiments in accordance with the present disclosure will be described with reference to the drawings, in which.

DETAILED DESCRIPTION

Figure 1:
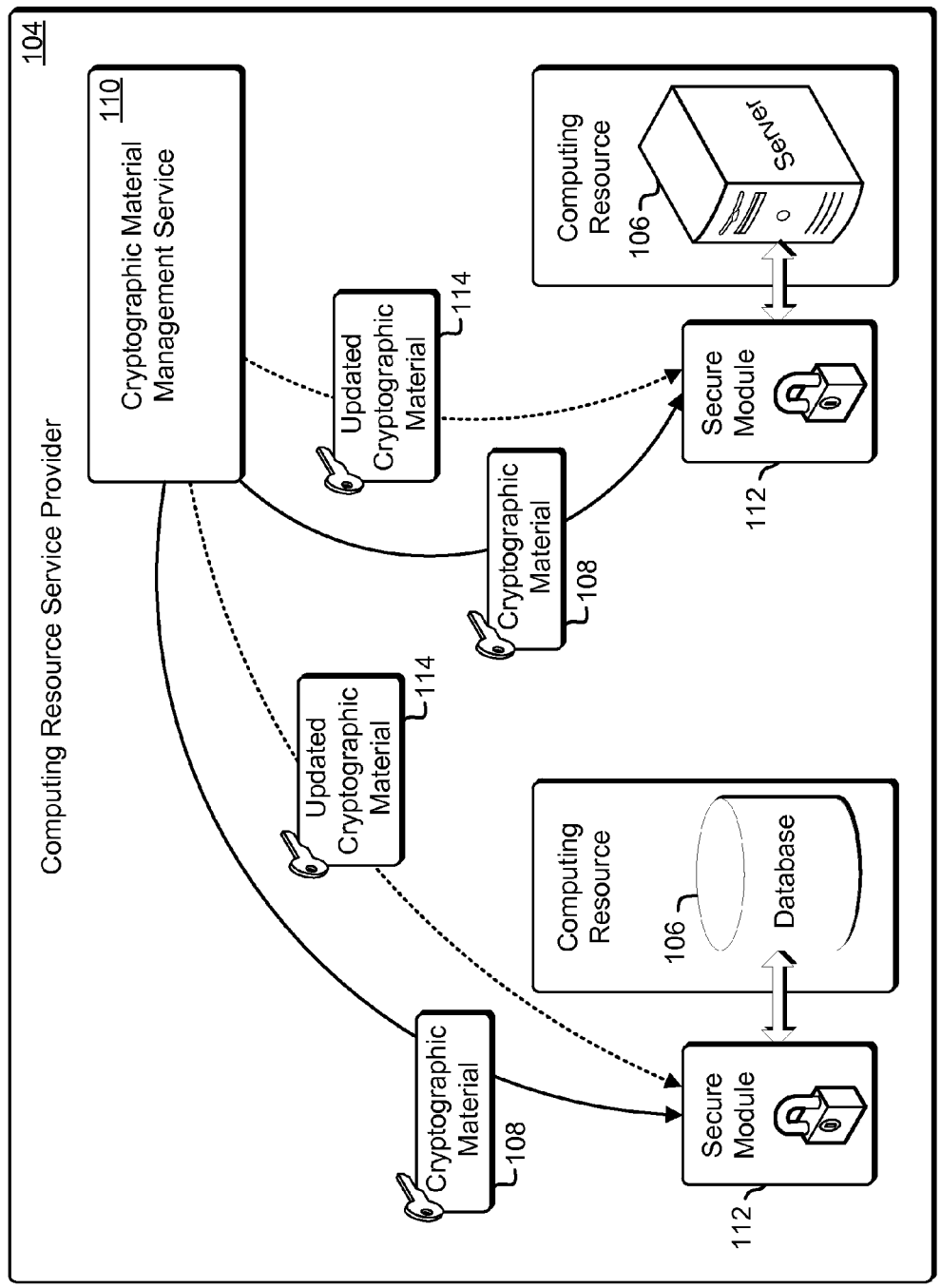
FIG. 1 shows an example of distributing and updating cryptographic material in accordance with at least on embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include distributing cryptographic material for use by computing resources that are provisioned by a computing resource service provider. The cryptographic material may be any type of data is used to secure communication between parties and may, for example, be a digital certificate or private keys associated with the digital certificate, among others. The computing resources may be computer systems, databases or storage volumes, among others, that are provisioned by the computing resource service provider for satisfying customers' computing needs. Distributing the cryptographic material may include making the cryptographic material available for use by the computing resources to perform cryptographic operations that secure communication of the computing resources.

A customer of the computing resource service provider, which may be an organization having provisioned computing resources to provide services to employees, may request (e.g., via an application programming interface (API) call) that cryptographic material be made available for use by the provisioned computing resources. The computing resource service provider may have a cryptographic material management service, which may be a collection of computing resources including servers and databases, among others, configured to receive and evaluate the request and cause the cryptographic material to be made available for use by the provisioned computing resources. The cryptographic material management service may further request that the cryptographic material be generated, for example, by making a service call to a certificate authority to generate the cryptographic material.

Following generation of the cryptographic material, the cryptographic material management service makes the cryptographic material available to the computing resources. Making the cryptographic material available to the computing resources may include provisioning, for each computing resource, a secure module and sending the cryptographic material for storage by the secure module. The secure module may be any device, physical or provisioned virtual, that securely stores cryptographic material or performs cryptoprocessing operations using the cryptographic material. The secure module may be logically attached to computing resource via a port of bus of the computing resource. For example, upon provisioning the secure module and sending the cryptographic material to the secure module, the secure module may be logically attached to the computing resource via a universal serial bus (USB) port or a peripheral component interconnect (PCI) port of the computing resource. As described herein, the computing resource may be instantiated using the underlying computing hardware of a host system. A control domain of the host system may be configured to provision the secure module and cause the secure module to be logically attached to the computing resource. Logical attachment of the secure module is detectable by a configured driver of the computing resource that is compliant with the type of interface used to attach the secure module.

The secure module may be configured to categorize (for example, by tagging) the cryptographic material as non-exportable and may prevent the computing resource from importing the cryptographic material using its interface to the secure module. Conversely, however, the computing resource may be programmatically configured to request the performance of cryptographic operations by the secure module or the cryptoprocessor thereof. The cryptographic operations may include request signing (i.e., digitally signing requests), among others, and requesting the performance of the cryptographic operations may be done by making API configured function calls to the secure module. An outcome of the cryptographic operations but not the cryptographic material used to perform the cryptographic operations may be provided to the computing resource for use securing its communications.

In addition, to distributing cryptographic material to the secure modules, the cryptographic material management service may renew or update the cryptographic material retained by the secure module. Renewing the cryptographic material may be performed periodically, according to an aperiodic time schedule or as a result of a trigger. Further, the cryptographic material may be renewed prior to the expiry of the cryptographic material. The cryptographic material management service may maintain an association between the computing resources and identities of cryptographic material made available to the computing resource or their expiration time. The cryptographic material management service may cause updated cryptographic material to be sent to the secure modules. Upon receipt of the updated cryptographic material, the secure modules may replace existing stored cryptographic material with the updated cryptographic material and may use the updated cryptographic material for further fulfillment of programmatic requests for performing cryptographic operations received from the computing resources.

The renewal of the cryptographic material may be transparent to the computing resource or an application or operation system thereof that requests performing cryptographic operations. Transparent renewal may be undetectable by the computing resource or associated applications. The computing resource or application or operation system thereof may continually utilize the cryptographic material of the secure module without interruption due to the renewal or without detecting occurrence of the renewal. Furthermore, similar to the replaced cryptographic material, the renewed cryptographic material is also non-exportable to and non-readable by the computing resource.

FIG. 1 shows an example of distributing and updating cryptographic material in accordance with at least on embodiment. A computing resource service provider 104 is shown to include a cryptographic material management service 110. The computing resource service provider 104 provisions a plurality of computing resources 106 (singularly referred to herein as computing resource 106) and the plurality of computing resources 106 may be provisioned for a customer of the computing resource service provider 104. The computing resources 106, which are shown to include a server and a database, may be provisioned using computing devices of the computing resource service provider 104, which may include servers, storage disks and routers, among others. The cryptographic material management service 110, which may be one or more servers or databases, among other computing resources, may be configured to distribute cryptographic material 108 that are to be made available to the computing resources 106.

Distributing the cryptographic material 108 may be controlled by a customer (not shown) for which the computing resources 106 are provisioned and may be performed in response to a customer's request. A secure module 112 as described herein is provisioned for each computing resource 106, and the cryptographic material 108 is sent to the secure module 112, whereby the secure module 112 is detectable by the computing resource 106 and programmatically accessible to the computing resource 106 for performing cryptographic operations using the cryptographic material 108. The cryptographic material 108, however, may not be exported to the computing resource 106. The cryptographic material management service 110 is also configured to renew the cryptographic material 108 to ensure continuous availability of the cryptographic material for use by the computing resources 106. The cryptographic material management service 110 obtains updated cryptographic material 114 and causes the updated cryptographic material 114 to be sent to the secure modules 112 for use by associated computing resources. As described herein, the updated cryptographic material 114 may replace the previously provided cryptographic material 108 and updating the cryptographic material may be transparent or non-detectable to the computing resource 106 or an entity thereof, such as an application or an operating system.

Figure 2:
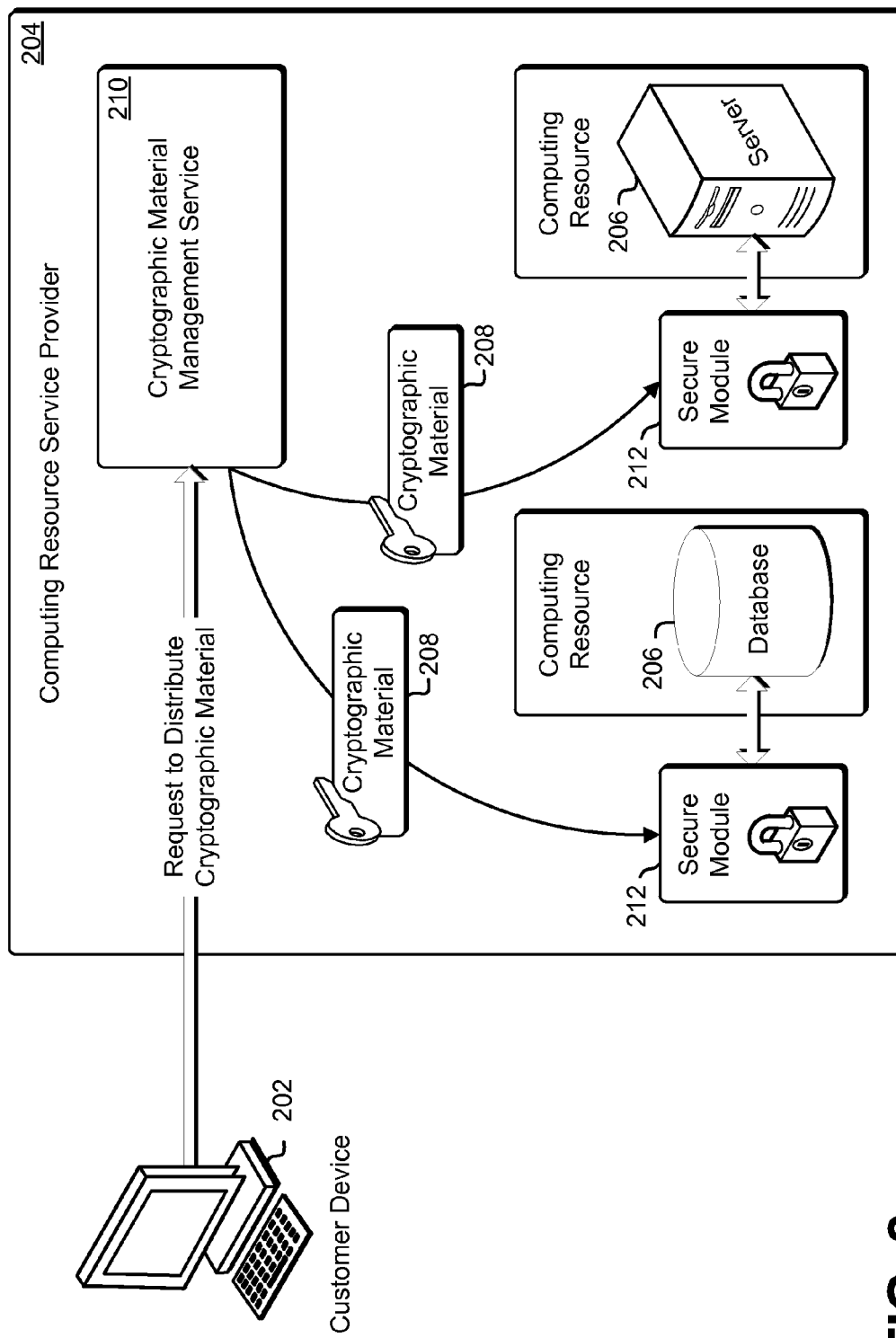
FIG. 2 shows an example of a customer device in communication with a computing resource service provider having a cryptographic material management service in accordance with at least one embodiment.

FIG. 2 shows an example of a customer device in communication with a computing resource service provider having a cryptographic material management service in accordance with at least one embodiment. The customer device 202 may be any type of device that is capable of communicating with the computing resource service provider 204. The customer device 202 may be a computer system of an administrator of an organization that is a customer of the computing resource service provider 204. The customer device 202 may communicate with the computing resource service provider 204 over a network (not shown), whereby the customer device 202 may be used to manage computing resources of the customer (for example, the organization) that are provided by the computing resource service provider 204. Managing the computing resources of the customer may include launching by, for example, instantiating the computing resources, and configuring the computing resources. Managing the computing resources may include causing cryptographic material to become available for use by the computing resources as described herein.

The computing resource service provider 204 may provide a variety of services to the customer. The computing resource service provider 204 may include a plurality of computing devices (such as servers, data storage devices or routers, among others) that are configured to provide computing functionality to customers. The computing resource service provider 204 may operate large-scale data centers or server farms that service the computing needs of customers. The computing resource service provider 204 is shown in FIG. 2 to include a plurality of computing resources 206 (singularly referred to herein as computing resource 206) that are provisioned for the customer. The computing resources 206, which are exemplary, are shown to include a server and a database, however, in various embodiments any number or type of computing resources 206 may be made available to provide computing functionality to the customer. For example, the computing resource service provider 204 may include a virtual computer system service that is configured to instantiate virtual computer system.

The computing resource service provider 204 includes a cryptographic material management service 210. The cryptographic material management service 210 may include computing resources (such as databases, servers or routers, among others) that are configured to cause cryptographic material 208 to be made available to a customer's computing resource 206. Further, the cryptographic material management service 210 may service customer requests for making the cryptographic material 208 available to the computing resource 206. Servicing a customer's request may include receiving the request, evaluating the request (for example, to determine whether an enforced policy allows fulfillment of the request) as well as fulfilling the request based at least in part on the evaluation.

As shown in FIG. 2, the customer device 202 sends to the cryptographic material management service 210 a request to distribute cryptographic material. The request may be an application programming interface (API) function call, among others. Further, an administrator or other type of principal associated with the customer organization may make the request using a user interface (UI), which may, for example, be a portal. The user interface may be used by the administrator to identity the computing resources 206 to which the cryptographic material 208 is to be provided for use. Furthermore, the user interface may be used to identify the cryptographic material 208 as well as specify whether the cryptographic material 208 is required to be generated as described herein.

The cryptographic material management service 210 may receive the request to distribute cryptographic material and may evaluate the request. Evaluating the request may include identify a policy that dictates the dissemination of the cryptographic material 208 for use by computing resources 206. The policy may be usable to determine whether the request may be fulfilled. If it is determined that the request to distribute cryptographic material is to be fulfilled, the cryptographic material 208 is made available for use by the computing resources 206.

The cryptographic material 208 may be any data used to secure communication between parties. The cryptographic material 208 may be used to ensure the confidentiality or integrity of communicated data as well as to authenticate or repudiate parties to a communication. The cryptographic material 208 may include a public key or a private key of a public key certificate or a digital certificate. For example, the cryptographic material 208 may be used to encrypt data prior to transmission or decrypt received data. In addition to the key, the cryptographic material 208 may also include an identity associated with the certificate, a signature for verifying the certificate or a validity period or expiration data or time, among others.

Making the cryptographic material 208 available to a computing resource 206 may include sending the cryptographic material 208 to a secure module 212 associated with the computing resource 206, whereby the cryptographic material 208 may be stored by the secure module 212. The secure module 212 may be any type of device that is configured to securely store (for example, 'safeguard') or manage the cryptographic material 208. The secure module 212 may be a physical device or a virtual device that is instantiated using underlying physical storage or computing resources. In addition to being a store for the cryptographic material 208 (for example, a keystore), the secure module 212 may be equipped with a cryptoprocessor. The cryptoprocessor may be any type of processor (for example, controller) that is configured for performing cryptographic operations. The cryptoprocessor may be a dedicated system-on-chip (SoC) or computer-on-chip (CoC). The secure module 212 may be configured to cause cryptographic operations to be performed within the secure module 212. Further, decrypted data or decrypted program instructions may not be exported from the secure module 212 to a device or environment lacking requisite security. Cryptographic operations that may be performed by the secure module 212 may utilize the received cryptographic material 208 as well as other cryptographic material that is stored by the secure module 212.

The secure module 212 may, in various embodiments, be a hardware secure module (HSM), a trusted platform module (TPM) or a smartcard, among others. As an HSM, the secure module 212 may be attached to the computing resource 206 or a host whose resources are used to provision the computing resource 206. Alternatively, the HSM may be remote in relation to the computing resource 206 or host and may be accessible to either via a network, whereby, for example, the HSM may be in a remote facility. The secure module 212 may be attached to a computing resource 206 of the customer using any type of bus or port. For example, a universal serial bus (USB) port or a peripheral component interconnect (PCI) port may be used to attach the secure module 212 to the computing resource 206 thereby facilitating use of the cryptographic material 208 by the computing resource 206. As described herein, the secure module 212 may be virtual module. For example, in the case where a computing resource 206 is a virtual computer system that is instantiated on underlying server using a hypervisor, the server or a hypervisor-initiated privileged domain (such as domain-0 or dom0) may be used for logically attaching a secure module 212 that is a virtual secure module to the virtual computer system. The virtual secure module may then be accessible to an unprivileged domain (also known as domU) of the hypervisor. The virtual computer system may be configured with a driver for the attached secure module 212, and upon attachment of the virtual secure module, the virtual computer system may detect the virtual secure module and use the virtual secure module. In various embodiments, the secure may module 212 may be a network-attached device and may be accessible to the computing resource 206 via a network.

Making the cryptographic material 208 available to a computing resource 206 making include permitting use of the cryptographic material 208 by the computing resource 206 while at the same preventing exposure of the cryptographic material 208 to the computing resource 206. Preventing exposure of the cryptographic material 208 to the computing resource 206 may include barring the cryptographic material 208 from being exported from the secure module 212 to the computing resource 206. Further, preventing exposure of the cryptographic material 208 may include preventing the cryptographic material 208 from being copied to another entity or read by another entity. For example, the computing resource 206 may request that the cryptographic material 208 be used by the secure module 212 to perform cryptographic operations but the computing resource 206 may not import the cryptographic material 208. Further, the cryptographic material 208 may not be revealed to the computing resource 206 by, for example, providing the cryptographic material 208 to an application executed on or running on the computing resource 206. Preventing providing the cryptographic material 208 to the computing resource 206 further ensures safeguarding and protecting the cryptographic material 208. Furthermore, even though the cryptographic material 208 is made available for use by the computing resource 206, the cryptographic material 208 may not be provided to the customer device 202 or divulged or disclosed to the customer of the computing resource service provider 204 or an administrator or principal of an organization that is a customer of the computing resource service provider 204. Accordingly, the cryptographic material 208 may be retained by the secure module 212 and used for performing cryptographic operations without the risk of exposure or compromise.

Figure 3:
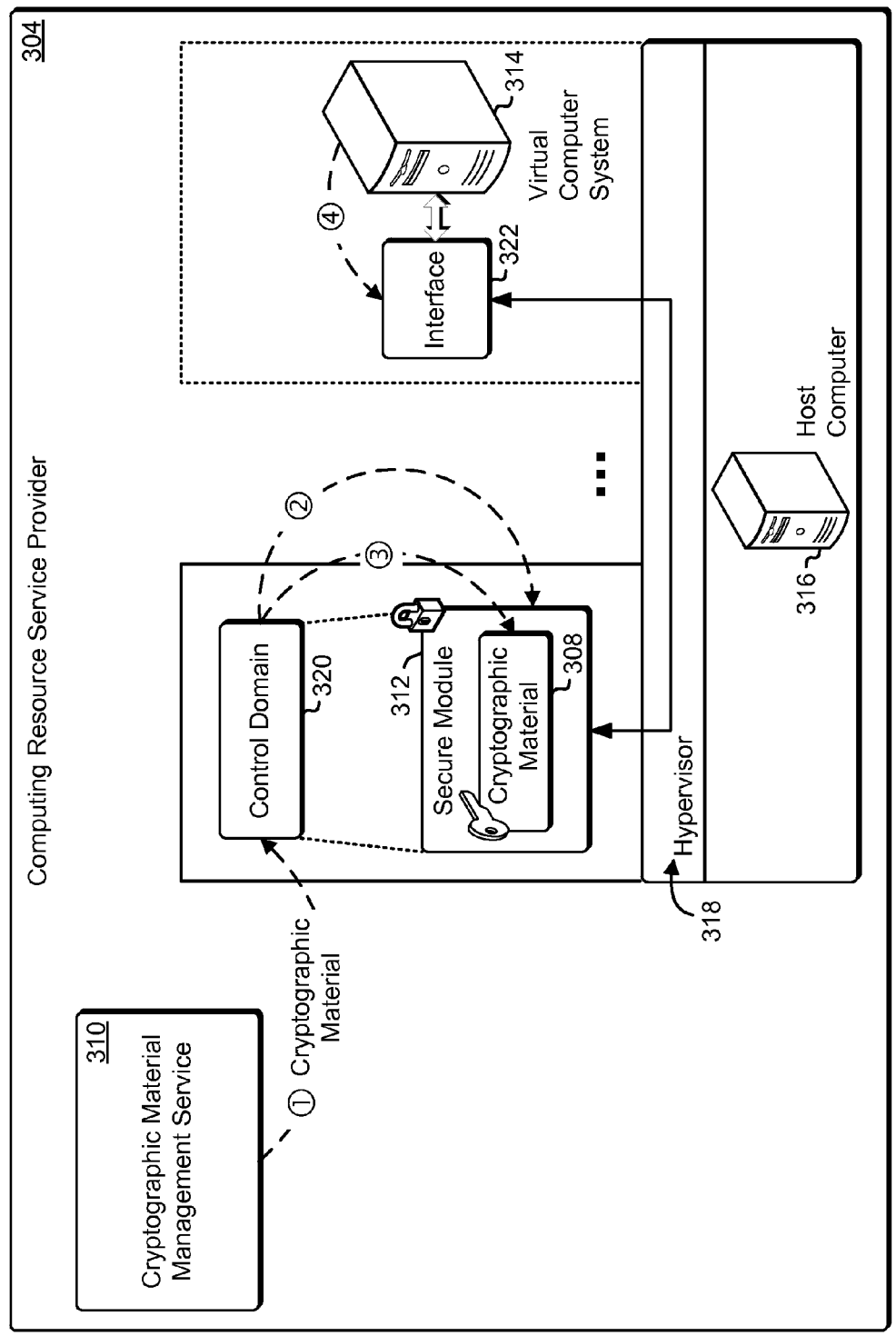
FIG. 3 shows an example of controlled cryptographic material distribution for use by a designated computing resource in accordance with at least on embodiment.

FIG. 3 shows an example of controlled cryptographic material distribution for use by a designated computing resource in accordance with at least on embodiment. Similar to FIG. 2, FIG. 3 shows a computing resource service provider 304 that includes a cryptographic material management service 310 and an instantiated computing resource. The instantiated computing resource is a virtual computer system 314 that instantiated using the computing functionality provided by an underlying host computer system 316. The host computer system 316 may be any type of computer system, such as a server. A hypervisor 318 is used to emulate computing functionality that is used by the virtual computer system 314 and map the computing functionality of the underlying host computer system 316 to that of the virtual computer system 314. It is noted that the hypervisor described with reference to FIG. 3 is exemplary and any type of virtualization layer or virtualization stack may be used in alternative embodiments.

A control domain 320 of the host computer system 316 is shown in FIG. 3. The control domain 320 (also known as a privileged domain or dom0) is associated with special privileges. The privileges may include accessing the underlying hardware of the host computer system 316. Further, the control domain 320 may run device drivers of the underlying hardware of the host computer system 316 (such as network devices including USB or PCI ports). The control domain 320 may further cause user domains (such as those of virtual computer system) to be launched.

Upon receipt of a request to distribute cryptographic material 308 to the virtual computer system 314 and evaluation of the request, the cryptographic material management service 310 may cause the cryptographic material 308 to be sent to the control domain 320 of the virtual computer system 314. The cryptographic material 308 may itself be encrypted or transfer of the cryptographic material 308 may otherwise be secured. For example, the cryptographic material 308 may be encrypted and the control domain 320 or a secure module storing the cryptographic material 308 (such as the secure module 312 described herein) may decrypt the encrypted cryptographic material 308 to obtain the cryptographic material 308 as plaintext. Further, authentication of the cryptographic material management service 310 may be performed prior to use of the cryptographic material 308. The authentication may be based at least in part on a shared secret, among other authentication techniques. Transferring the cryptographic material 308 to the control domain may also include providing updated cryptographic material. The updated cryptographic material may be provided in order to rotate cryptographic material. For example, expired cryptographic material or nearly expired cryptographic material may be replaced with the updated cryptographic material.

The control domain 320 may receive the cryptographic material 308. Further, the control domain 320 may authenticate the cryptographic material management service 310 as described herein. In addition, if the cryptographic material 308 is encrypted or encoded, the control domain 320 may cause the cryptographic material 308 to be decrypted or decoded, respectively. The control domain 320 then launches the secure module 312 for use in storing the cryptographic material 308 or performing cryptographic operations based at least in part on the cryptographic material 308. Launching the secure module 312 may include creating or instantiating the secure module 312 as a virtual secure module. The secure module 312 may be launched as a peripheral device of the virtual computer system 314, whereby the secure module 312 may be launched as a virtual USB or PCI device. Further, the secure module 312 may be logically attached to the virtual computer system 314. The computing, memory, or networking resources required for creating the secure module 312 may be a subset of those of the host computer 316 and the resources of the secure module 312 may be mapped by the hypervisor to resources of the host computer 316. The virtual computer system 314 may be configured with a driver for operating or controlling the attached secure module 312. Accordingly, the virtual computer system 314 may detect attachment of the secure module 312. Furthermore, the driver enables later use of the secure module 312 by the virtual computer system 314. In various embodiments, the virtual computer system 314 may be launched using a machine image. The machine image may be a customized template that is a package of the configuration of the virtual computer system 314 including the operating system and additional software, whereby the machine image may be used to launch a fleet or similarly configured virtual computer systems. The machine image may include a driver associated with the attached secure module 312.

Following launching the secure module 312, the control domain 320 causes the cryptographic material 308 to be provided to the secure module 312. As described herein, decryption of encrypted cryptographic material or sender authentication may alternatively be performed by the secure module 312. The cryptographic material 308 may be classified (for example, by marking or tagging) in secure module 312 as non-exportable and, accordingly, the cryptographic material 308 may be not be read from the secure module 312 or provided to another entity.

Further, upon launching the secure module 312, the virtual computer system 314 detects using a configured driver that attachment of the secure module 312. Programs execution on the virtual computer system 314 may now make function calls (such as application programming interface (API) configured functions calls) to the secure module 312. Function calls made by the virtual computer system 314 invoke routines by the driver, and the driver in turn issues commands to the secure module 312. As a result, the virtual computer system 314 has an interface 322 as shown in FIG. 3 to the secure module 312. Using the interface, the virtual computer system 314 may be configured to make requests to the secure module 312 using, for example, API configured functions calls. The virtual computer system 314 may request the secure module 312 to perform cryptographic operations. The cryptographic operations may include request signing, among other operations. For example, if the cryptographic material 308 includes a private key, the virtual computer system 314 may request, via the interface 322, the secure module 312 to sign a second web services request using the private key. The secure module 312 may sign the second request using a configured cryptoprocessor of the secure module 312. Upon signing the second request, the signed second request may be provided to the virtual computer system 314, and the virtual computer system 314 may send the second request to a receiving party.

As described herein, the cryptographic material 308 is non-exportable from the secure module to the virtual computer system 314 and the cryptographic material 308 may be securely stored by the secure module 312. For example, an application of the virtual computer system 314 may not retrieve the cryptographic material 308 from the secure module 312 and cause the cryptographic material 308 to be stored in the memory space of the virtual computer system 314. Because the virtual computer system 314 and control domain 320 are both instantiated using the host computer 316 and derive computational and memory resources, among others, from the host computer 316, the cryptographic material 308 may not be migrated or transferred from a memory area of the host computer 316 mapped to the control domain 320 or secure module 312 to a memory area mapped to the virtual computer system 314.

The cryptographic material 308 may be updated by the cryptographic material management service 310, whereby updating the cryptographic material 308 may include causing cryptographic material that is stored by the secure module to be rotated and replaced with other cryptographic material. Updating the cryptographic material 308 may be performed in response to a request from a customer of the computer resource service provider 304. Further, the cryptographic material 308 due at least in part to the cryptographic material 308 being expired or an upcoming expiration of the cryptographic material 308. The cryptographic material 308 may be become expired if an expiration time associated with the cryptographic material 308 is reached. Further, the cryptographic material 308 may be generational, whereby a generation of cryptographic material to which the cryptographic material 308 belongs may become expired as a result of being replaced by a forthcoming or subsequent generation. The cryptographic material 308 belonging to the prior generation may be replaced with updated cryptographic material that belongs to the subsequent generation. Updating the cryptographic material 308 may be performed prior to expiration to ensure uninterrupted availability of current cryptographic material for use by the virtual computer system 314. Expiration of the cryptographic material 308 may result render the cryptographic material 308 unusable The cryptographic material management service 310 may retain an associated between the identity of the cryptographic material 308 distributed for use by the virtual computer system 314 and an indication of an expiration of the cryptographic material 308. The indication of the expiration of the cryptographic material 308 may be an expiration time or a generation number or version, among others. The cryptographic material management service 310 may cause the cryptographic material 308 to be updated before the expiration time associated with the cryptographic material 308 or before the generation of the cryptographic material 308 is due to become expired. The cryptographic material management service 310 sends, to the control domain 320, a request to update the cryptographic material 308, whereby the request may include updated cryptographic material. The control domain 320, on the other hand, may replace the cryptographic material 308 of the secure module 312 with the updated cryptographic material. Following replacement, a cryptoprocessor of the secure module 312 may use the updated cryptographic material for performing cryptographic operations requested by the virtual computer system 314 or applications thereof. As may be recognized, updating the cryptographic material may not require secure module 312 to be relaunched. Conversely, the previously launched and instantiated secure module 312 used for storing the replaced cryptographic material 308 may be continued to be used.

Figure 4:
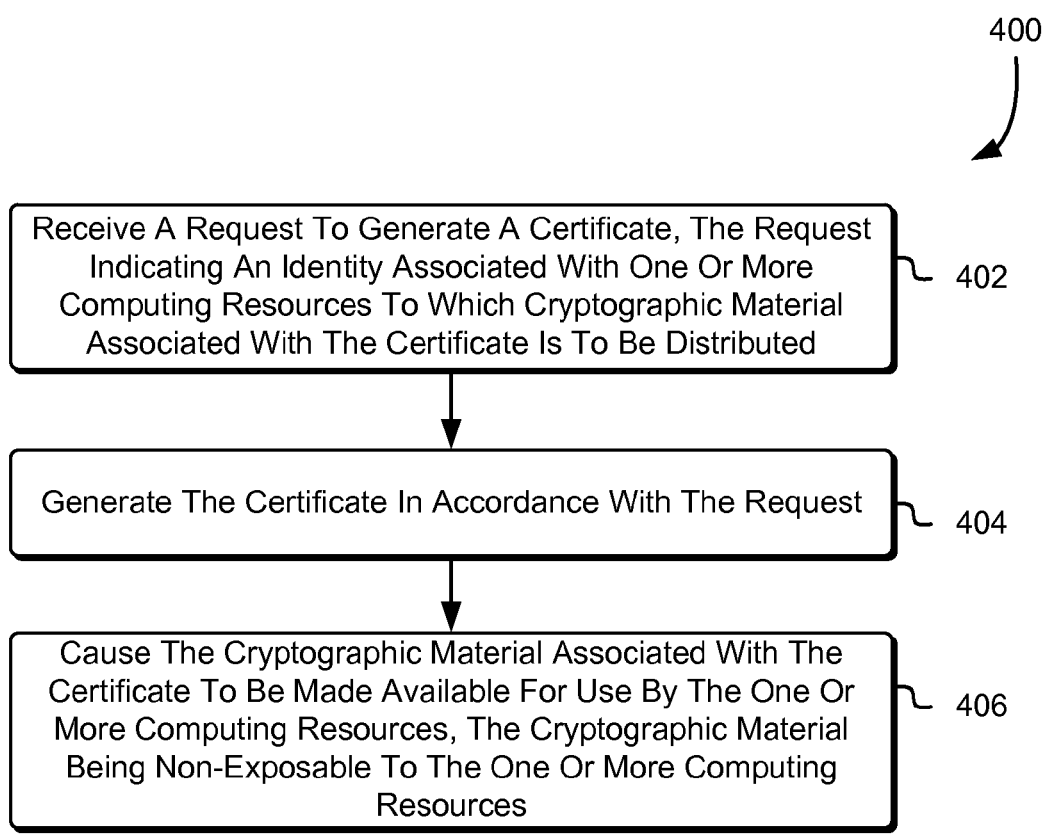
FIG. 4 shows an example of a method for controlled cryptographic material distribution in accordance with at least on embodiment.

FIG. 4 shows an example of a method for controlled cryptographic material distribution in accordance with at least on embodiment. In the process 400, a cryptographic material management service, such as the cryptographic material management service 210 described with reference to FIG. 2, receives 402 a request to generate a certificate, whereby the request indicates an identity associated with one or more computing resources to which cryptographic material associated with the certificate is to be distributed. The request may be an API function call made by a customer (using a customer device) of a computing resource service provider providing the one or more computing resources to the customer. The request may be authenticated by the cryptographic material management service, and it may be determined whether a policy of the customer allows fulfillment of the request as described herein.

The cryptographic material management service then generates 404 the certificate in accordance with the request. The cryptographic material management service further causes 406 the cryptographic material associated with the certificate to be made available for use by the one or more computing resources. As described herein, making the cryptographic material available for use by a computing resource may include transferring the cryptographic material to a secure module of the computing resource. The computing resource may use the cryptographic material stored by the secure module by making function calls to the secure module to perform one or more cryptographic operations using the cryptographic material. However, the cryptographic material is non-exposable to the one or more computing resources as described herein.

Figure 5:
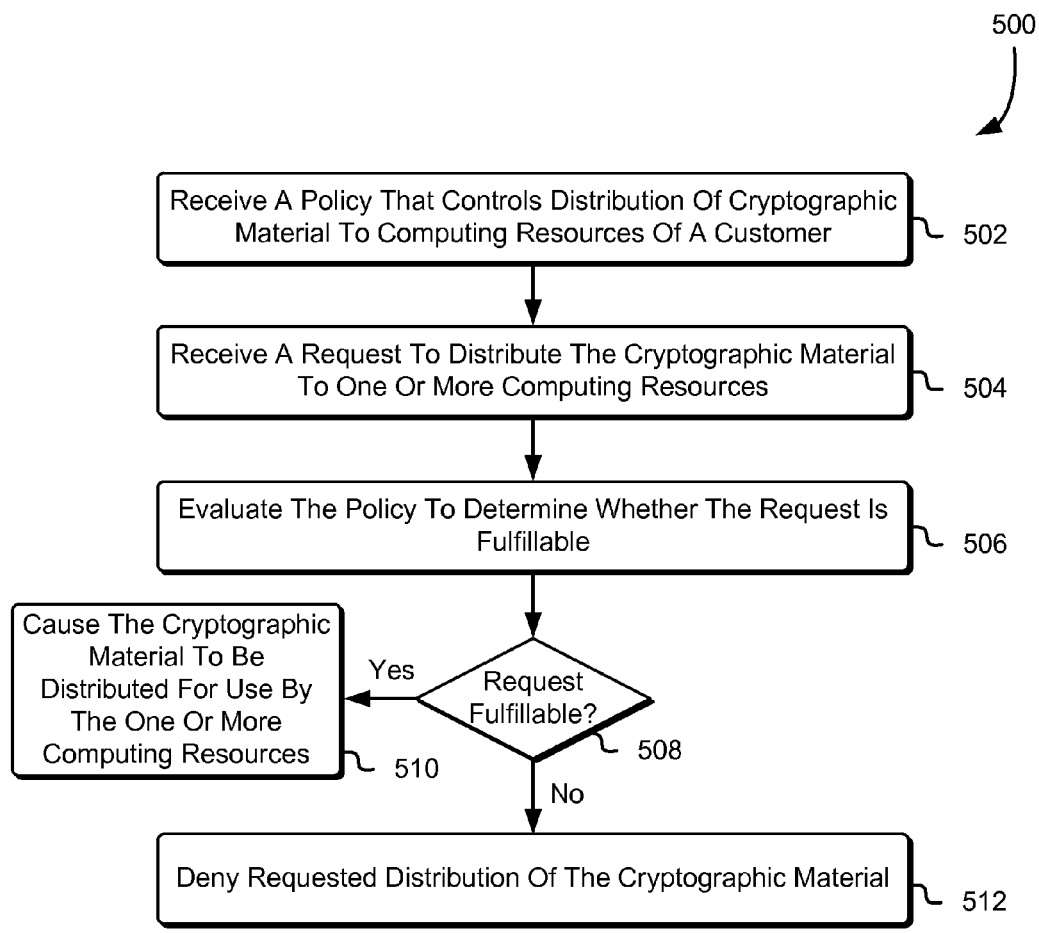
FIG. 5 shows an example of a method for policy-based distribution of cryptographic material in accordance with at least one embodiment.

FIG. 5 shows an example of a method for policy-based distribution of cryptographic material in accordance with at least one embodiment. In the process 500, a cryptographic material management service, such as the cryptographic material management service 210 described with reference to FIG. 2, receives 502 a policy that controls distribution of cryptographic material to computing resources of a customer of computing resource service provider. The policy may pertain to resources of the customer that are provisioned by the computing resource service provider. In various embodiments, the policy may apply to a grouping (for example, a subset) of the customer's resources that are provisioned by the computing resource service provider. The policy may specify the identities of computing resource to which the cryptographic material may be made available or, alternatively, the identities of computing resource that are to be prevented from using the cryptographic material. For example, the policy may include the identities of "blacklisted" computing resources.

The cryptographic material management service then receives 504 a request to distribute the cryptographic material to one or more computing resources. The cryptographic material management service then evaluates 506 the policy to determine whether the request is fulfillable. Evaluating the policy may include checking or inspecting the policy to determine whether the one or more computing resources to which distribution of the cryptographic material is requested are "blacklisted". Further, evaluating the policy may include determining whether distribution of the cryptographic material to the one or more computing resources is permissible.

If a positive determination is made 508, the cryptographic material management service causes 510 the cryptographic material to be distributed for use by the one or more computing resources. Conversely, if a negative determination is made 508, the cryptographic material management service denies 512 the request distribution of the cryptographic material. Following the denial, the cryptographic material management service may send a notification to the requestor indicating the denial. The process 500 may be used to policy-based evaluation of requests to distribute cryptographic material to computing resources. However, in various embodiments, the policy may govern service-initiated distribution of cryptographic material as described with reference to FIG. 6.

Figure 6:
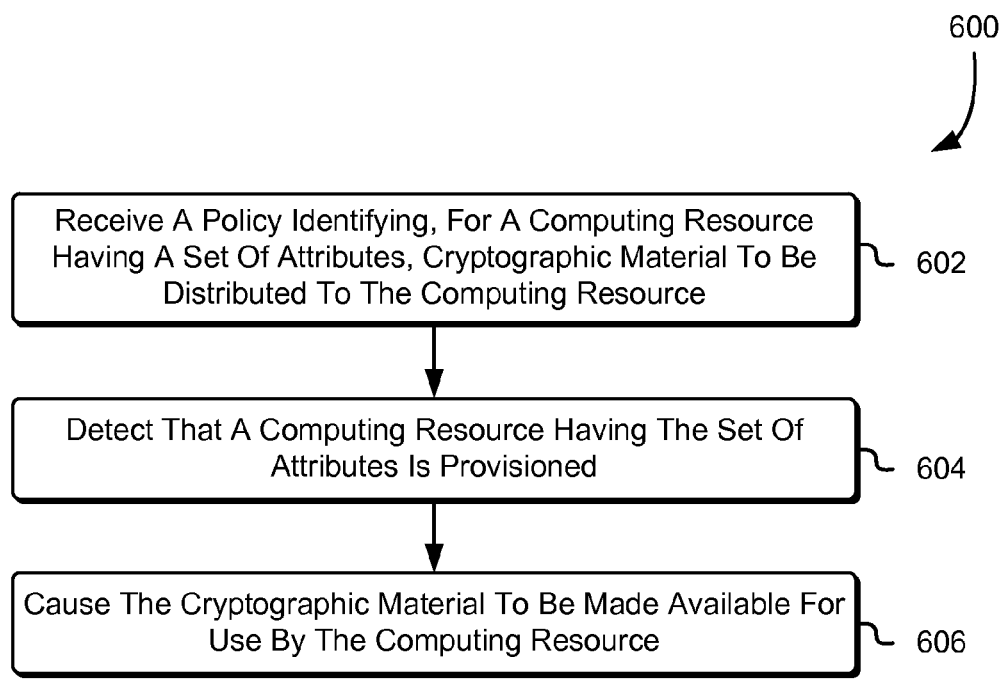
FIG. 6 shows an example of a method for policy-based distribution of cryptographic material in accordance with at least one embodiment.

FIG. 6 shows an example of a method for policy-based distribution of cryptographic material in accordance with at least one embodiment. In the process 600, a cryptographic material management service, such as the cryptographic material management service 210 described with reference to FIG. 2, receives 602 a policy identifying, for a computing resource having a set of attributes, the cryptographic material to be distributed to the computing resource. The attributes may include the type of computing resource, such as a server, database or storage volume, among others. Further, the attributes may include an indication of a group of computing resources of which the computing resource is a member. The group of computing resources may be a configurable pool of shared computing resources allocated by a computing resource service provider (for example, to a customer of a plurality of customers). The group of computing resources may have identical, similar, or corresponding tags. Further, the group of computing resources may be provisioned to scale the computing capability of a customer of an application or service of the customer. For example, some computing resources may be provisioned for use in providing a web service for the customer, whereas other computing resources may be provisioned for providing an application service. The distribution of the cryptographic material may depend on the grouping of the computing resource and the need of the computing resource for the cryptographic material.

The cryptographic material management service then detects 604 that a computing resource having the set of attributes is provisioned. The computing resource service provider may have provisioned the computing resource in order to upwardly scale the computing resources available for the customer. The scaling may be due at least in part to increased demand for the customer's computing resources. In response to detecting that the computing resource having the set of attributes is provisioned, the cryptographic material management service causes 606 the cryptographic material to be made available for use by the computing resource as described herein.

Figure 7:
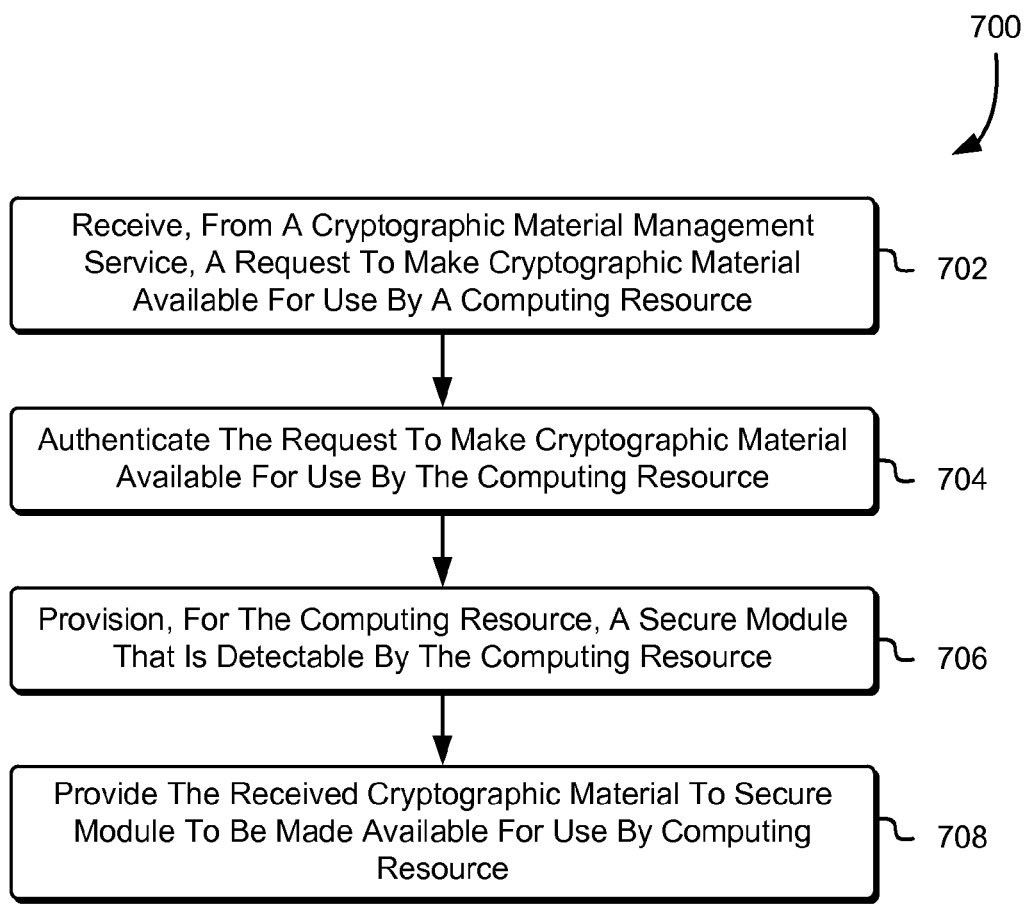
FIG. 7 shows an example of a method for provisioning a secure module for storing cryptographic material for use by a computing resource in accordance with at least one embodiment.

FIG. 7 shows an example of a method for provisioning a secure module for storing cryptographic material for use by a computing resource in accordance with at least one embodiment. In the process, a control plane entity, such as control domain 320 described with reference to FIG. 3, receives 702 a request to make cryptographic material available for use by a computing resource, whereby the request is received from a cryptographic material management service. The control plane and entities thereof may be applications (for example, software) used by the computing resource service provider to control the services provided to customers. The control plane may be used to expose underlying computing functionality via manual or programmatic control. The cryptographic material management service may maintain an association between the identities of provisioned computing resources and the identities of underlying host systems of the computing resources or control plane entities thereof. Upon determining that cryptographic material is to be made available for use by a computing resource, the cryptographic material management service may identify the host system or control plane entity to which the cryptographic material should be provided.

The control plane entity then authenticates 704 the request to make cryptographic material available for use by the computing resource. Authenticating the request may include verifying that the request originated from the cryptographic material management service. The authentication may be based at least in part on a secret shared between the control plane entity and the cryptographic material management service. Furthermore, other authentication techniques may be used include requesting signing. The control plane entity provisions 706, for the computing resource, a secure module that is detectable by the computing resource. Examples of the secure module include a virtual HSM, a virtual TPM, or network-attached device, among others, and provisioning the secure module may include launching the secure module.

The control plane entity then provides 708 the received cryptographic material to the secure module, whereby the cryptographic material may be stored by the secure module and may be made available for use by the computing resource. Providing the cryptographic material may include providing cryptographic material in an encrypted form, and following receipt of the encrypted cryptographic material, the secure module may decrypt the cryptographic material for use in performing cryptographic operations requested by the computing resource. The control plane entity may specify that the cryptographic material is non-exportable, or the secure module may be natively configured to cause the cryptographic material to be non-exportable, and the secure module may deny requests to read the cryptographic material.

Figure 8:
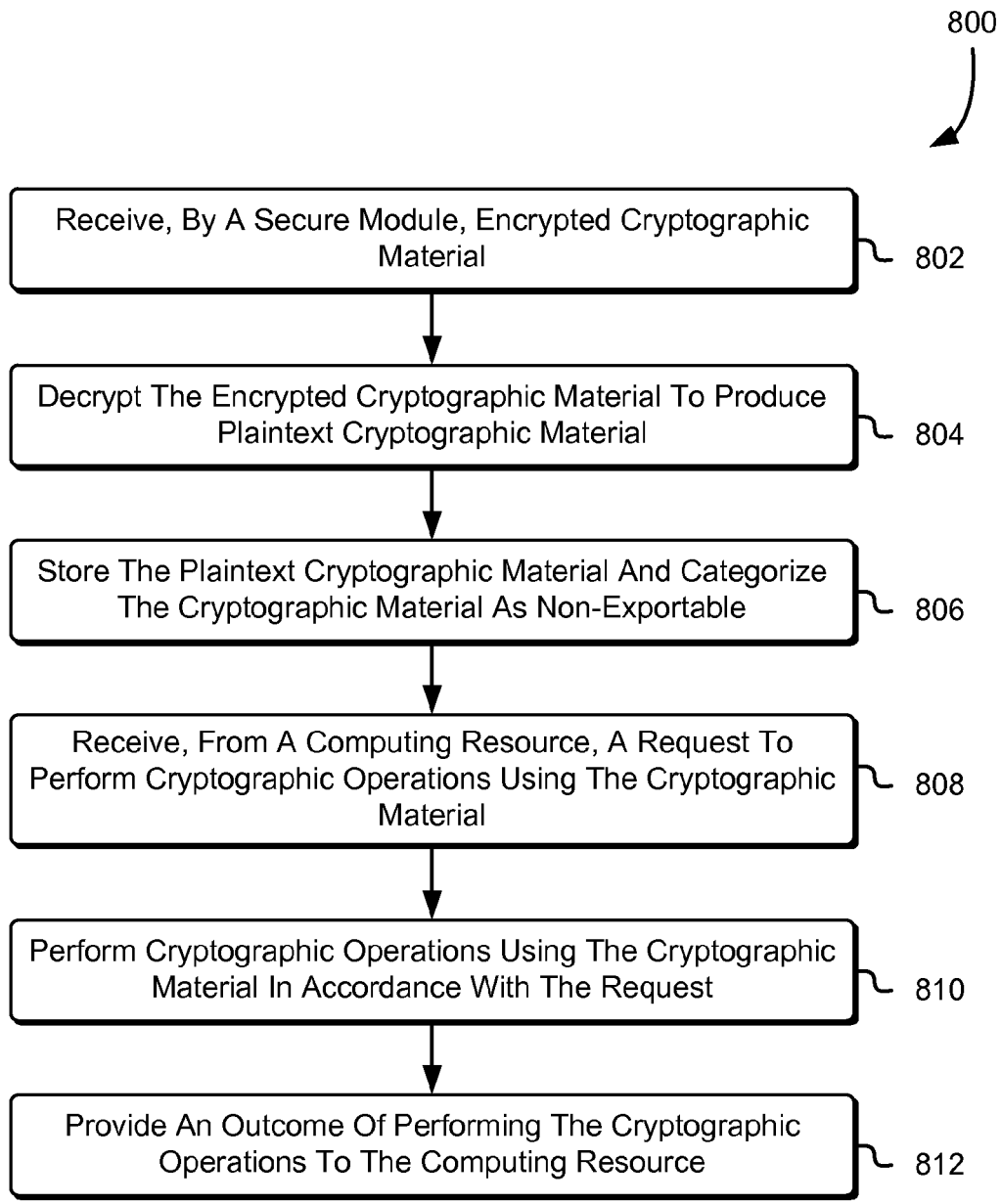
FIG. 8 shows an example of a method for providing cryptographic material to a secure module in accordance with at least one embodiment.

FIG. 8 shows an example of a method for providing cryptographic material to a secure module in accordance with at least one embodiment. In the process 800, a secure module, such as the secure module 212 described with reference to FIG. 2, receives 802 encrypted cryptographic material. As described herein, the cryptographic material may be a private key used in asymmetric encryption systems or an encryption/decryption key used in symmetric systems. Because the cryptographic material is encrypted, the secure module decrypts 804 the encrypted cryptographic material to produce plaintext cryptographic material.

The secure module then stores 806 the plaintext cryptographic material and categorizes the cryptographic material as non-exportable. It is noted that in various embodiments, the cryptographic material may be provided to the secure module as plaintext and, therefore, decryption of the cryptographic material may not be performed. The secure module then receives 808 from a computing resource a request to perform cryptographic operations using the cryptographic material, whereby an example of a cryptographic operation may include request signing. As described herein, the computing resource may have an interface to the secure module and may have programmatic access to the secure module, whereby the programmatic access enables the computing resource to make requests (for example, using API configured function calls) to the secure module.

The secure module performs 810 the cryptographic operations using the cryptographic material in accordance with the request. Further, the secure module provides 812 an outcome of performing the cryptographic operations to the computing resource. Accordingly, the computing resource may make use of the cryptographic material stored by the security module without the cryptographic material being exported to the computing resource or compromising the security of the cryptographic material.

Figure 9:
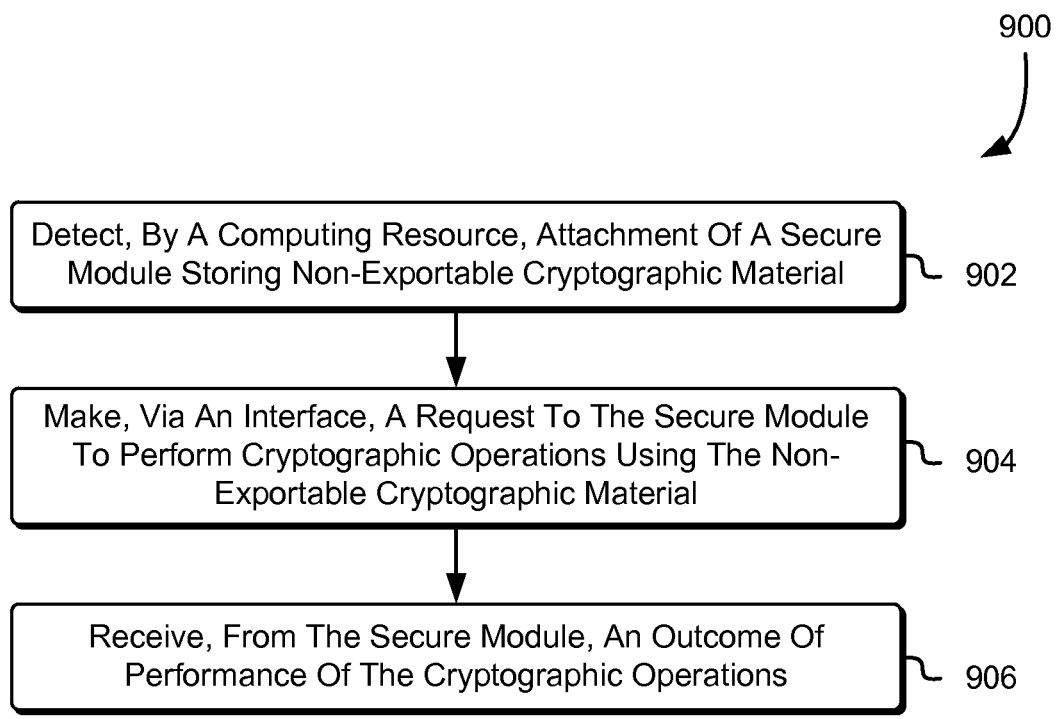
FIG. 9 shows an example of a method for making a request to a secure cryptographic module to perform cryptographic operations in accordance with at least one embodiment.

FIG. 9 shows an example of a method for making a request to a secure cryptographic module to perform cryptographic operations in accordance with at least one embodiment. In the process 900, a computing resource, which may be a virtual computer system, storage volume or database, among others, detects 902 attachment of a secure module storing non-exportable cryptographic material. The secure module may be a virtual smartcard or virtual HSM, among others, and the secure module may be equipped with a cryptoprocessor in addition to memory for storing the cryptographic material. Detecting the attachment of the secure module to the computing resource may be performed by a driver associated with the secure module executed by the computing resource. The driver may be configured to detect attachment of the secure module via a port or bus of the computing resource. Furthermore, the driver may be configured call subroutines based at least in part on requests or, in general, service calls made by the computing resource to the secure module.

Following detecting attachment of the secure module, the computing resource makes 904 a request to the secure module to perform cryptographic operations using the non-exportable cryptographic material. The request to perform the cryptographic operations may be made via an interface, whereby the interface may be a web services interface. Furthermore, the request may be an API function call, among others. In response to making the request, the computing resource receives 906 an outcome of performing the cryptographic operations by the secure module, whereby the cryptographic operations may be performed by a cryptoprocessor of the secure module.

Figure 10:
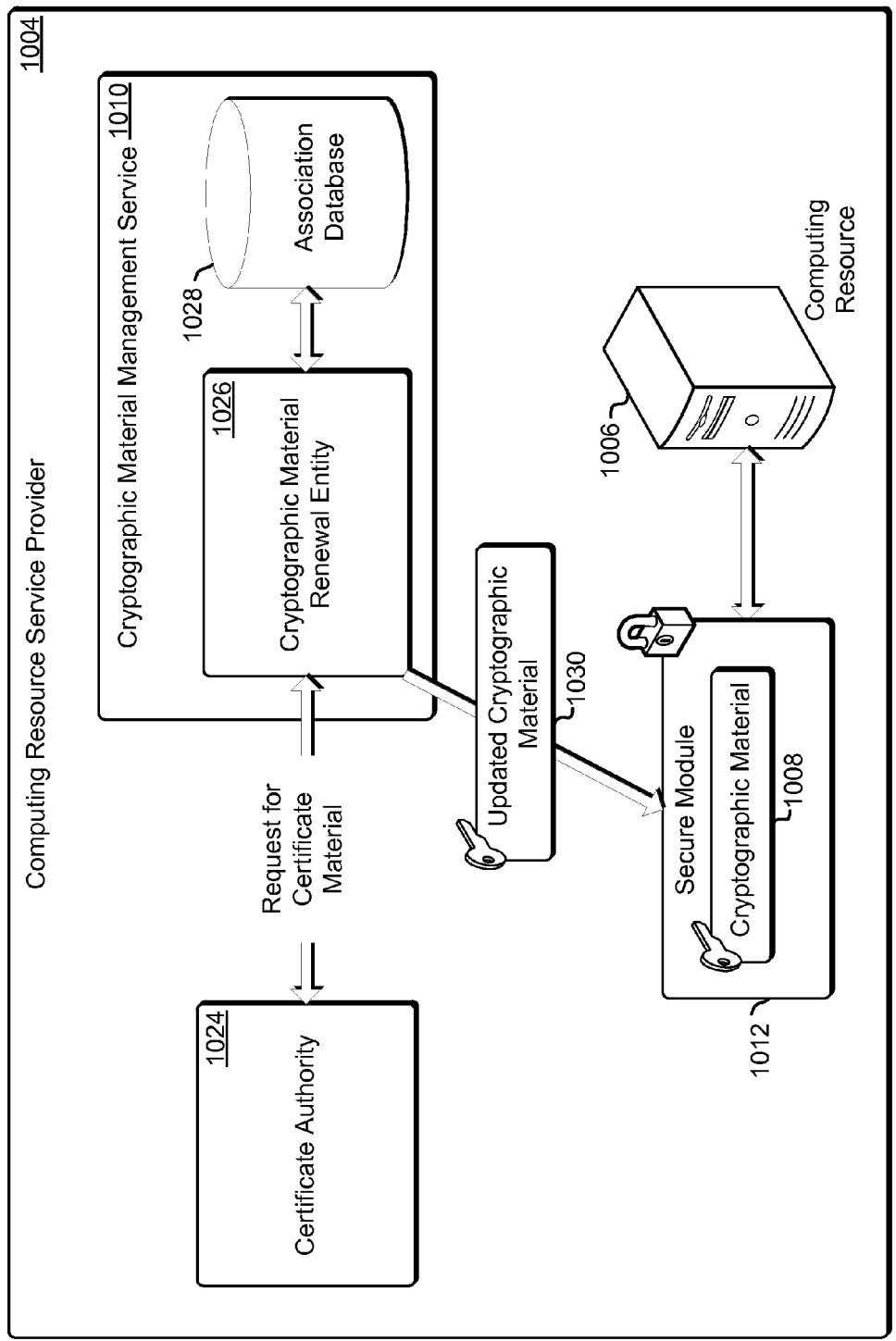
FIG. 10 shows an example of a cryptographic material management service configured to rotate cryptographic material of a computing resource in accordance with at least one embodiment.

FIG. 10 shows an example of a cryptographic material management service configured to rotate cryptographic material of a computing resource in accordance with at least one embodiment. A computing resource service provider 1004 is shown to include a cryptographic material management service 1010, a certificate authority 1024 and a computing resource 1006 having an associated secure module 1012. The computing resource service provider 1004, cryptographic material management service 1010, computing resource 1006 and associated secure module 1012 are similar to those described with reference to FIG. 2 and FIG. 3. The cryptographic material management service 1010 includes a cryptographic material renewal entity 1026 and an association database 1028. The cryptographic material renewal entity 1026, which may be a renewal agent, may be any type of computing system, such as a server, that is configured to cause cryptographic material associated with the computing resource 1006 to be updated, whereby updating cryptographic material may include rotating the cryptographic material or replacing a first set of cryptographic material with a second set of cryptographic material. The association database 1028 may store an association between the secure modules provisioned in the computing resource service provider 1004 and an expiration time of cryptographic material stored in the secure modules. Furthermore, in the event that the cryptographic material is a certificate or a key associated with the certificate, the association may include additional attributes, such as an identity of a certificate holder. The identity may be a domain name controlled by the certificate holder, among others.

The cryptographic material renewal entity 1026 may be configured to cause updated cryptographic material to be provided to the secure module 1012 periodically or based at least in part on a time schedule. The cryptographic material renewal entity 1026 may be configured to rotate the cryptographic material 1008 prior to their expiration, or, alternatively, the cryptographic material 1008 may be rotated independently of their expiration. For example, the periodically or time schedule-based renewal may occur with sufficient frequency such that the cryptographic material 1008 is always rotated prior to expiration.

Upon determining that the cryptographic material 1008 should be renewed, the cryptographic material renewal entity 1026 makes a request to the certificate authority 1024 for certificate material, whereby the request may be an API-configured function call. The certificate authority 1024 may be any entity that is configured to issue new or renewed or updated digital certificates. Further, the certificate authority 1024 may also be configured to rekey public or private keys associated with a digital certificate. The request may also include an identity of an owner of the certificate (also known as subject, such as for an X.509 certificate).

The certificate authority may perform one or more validity checks based at least in part on the request, whereby the validity checks may include determining that the cryptographic material renewal entity 1026 is authorized to receive a certificate on behalf of the certificate owner. Validation may include domain name validation, whereby proof of control or ownership of the domain name is determined. A certificate may not be issued or renewed by the certificate authority 1024 if the validation fails. If an identity of a certificate owner has been previously established or a permission to issue a certificate on behalf of the owner has been previously granted, a certificate may be renewed or rekeyed without further permission or without any further interaction The cryptographic material renewal entity 1026 receives the updated certificate material from the certificate authority 1024 in response to the request. Furthermore, the cryptographic material renewal entity 1026 causes the updated cryptographic material 1030 to be provided to the secure module 1012. The updated cryptographic material 1030 may replace existing cryptographic material 1008 stored by the secure module 1012, and the updated cryptographic material 1030 may be made available to the computing resource 1006 or an application thereof. Updating the cryptographic material may be transparent to the computing resource 1006 or an operating system or an application thereof. Further, updating the cryptographic material may be performed in a manner that enables the computing resource to programmatically cause the secure module to use the updated cryptographic material to perform cryptographic operations. In addition, providing the updated cryptographic material may be performed without updating a manner in which the secure module programmatically interacts with the secure module or notifying of the computing resource of use of the updated cryptographic material. For example, an operating system or an application of the computing resource 1006 may continue to make use of the updated cryptographic material 1030 after having made use of the cryptographic material 1008 without detecting that the cryptographic material 1008 was updated.

As described herein, updating the cryptographic material may include updating a private key associated with a certificate or a certificate chain, whereby a certificate chain may include of all the certificates needed to certify a subject identified by an end certificate. The certificate chain may be an ordered list of certificate that serves as a chain of trust and may be used for certificate verification. Further, updating the cryptographic material may be performed by the cryptographic material management service 1010 without requiring any actions to be performed by the computing resource 1006.

If the cryptographic material 1008 is a private key associated with a digital certificate, then the cryptographic material 1008 may be renewed as a result of rekeying. When rekeying is performed, a new private key (in addition to a new public key) may be issued for the certificate and the updated cryptographic material 1030 may include the new private key. In addition to rekeying, certificate renewal may be performed. When a certificate is renewed, the private key and public key associated with the certificate may not be changed. Instead a certificate may be updated and a certificate file or document may be changed, for example, to reflect a new validity period associated with the renewed certificate. It is noted that in various embodiments, a key store may be used to provide the private key to the cryptographic material management service 1010 or an entity thereof, such as the cryptographic material renewal entity 1026.

When a certificate is renewed, the certificate may be distributed for use by the computing resource 1006 as described herein. The updated certificate material 1030 may include the renewed certificate with changing the private key associated with the certificate. The renewed certificate may be provided to the secure module 1012 to be made available to the computing resource 1006.

A customer of the computing resource service provider 1004 for which the computing resource 1006 is provisioned may request automatic renewal of the cryptographic material of their associated computing resources by, for example, configuring a policy or making an API configured function call to the computing resource service provider 1004. For example, if the computing resource is a virtual computer system that uses a secure sockets layer (SSL) transport layer security protocol, the customer may request providing the cryptographic material enabling using SSL to the computing resource only once. An available configuration may permit the customer to request that the cryptographic material be automatically rotated (for example, periodically) such that the computing resource may continue to have programmatic access to the valid or unexpired cryptographic material. Providing the updated cryptographic material 1030 to the secure module 1012 may be performed using similar techniques as providing the cryptographic material 1008 described herein, whereby the updated cryptographic material 1030 may, for example, be encrypted for decryption by the secure module 1012.

Figure 11:
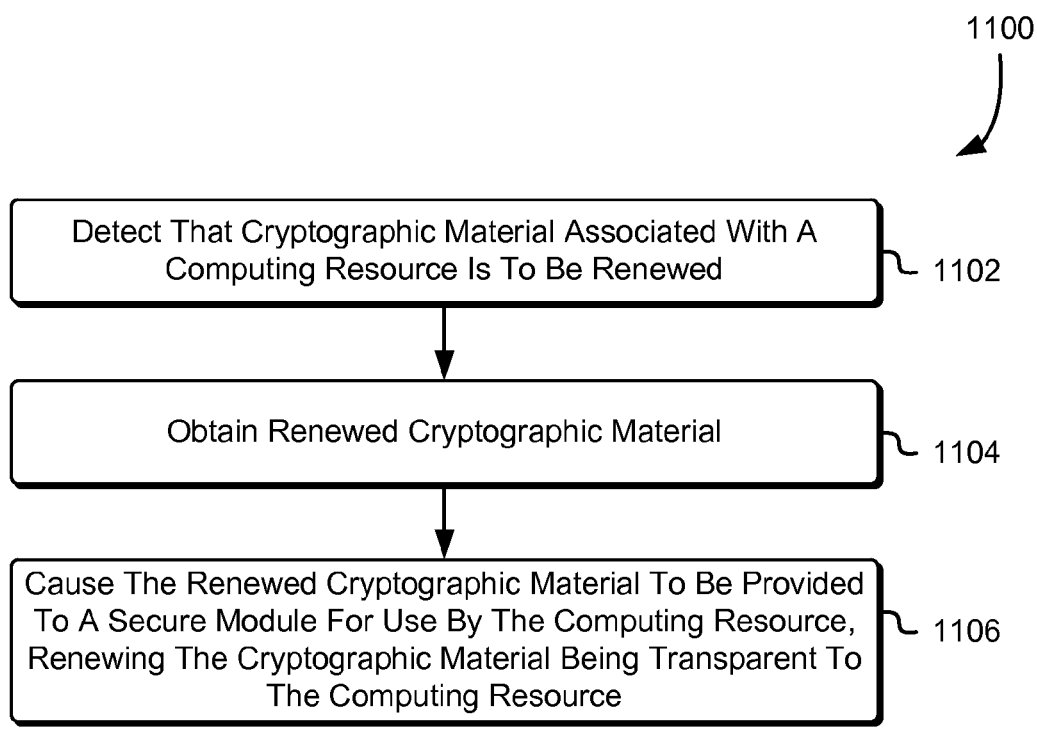
FIG. 11 shows an example of a method for renewing cryptographic material associated with a computing resource in accordance with at least one embodiment.

FIG. 11 shows an example of a method for renewing cryptographic material associated with a computing resource in accordance with at least one embodiment. In the process 1100, a cryptographic material renewal entity, such as the cryptographic material renewal entity 1026 described with reference to FIG. 10, detects 1102 that cryptographic material associated with a computing resource is to be renewed. Detecting that cryptographic material should be renewed may be due at least in part to the occurrence of a trigger. For example, the cryptographic material may be renewed periodically and reaching the end of the period for renewal may be the trigger. The cryptographic material renewal entity then obtains 1104 renewed cryptographic material. Obtaining the renewed cryptographic material may include requesting a certificate authority to issue certification material.

The cryptographic material renewal entity then causes 1106 the renewed cryptographic material to be provided to a secure module for use by the computing resource, whereby renewing the cryptographic material being transparent to the computing resource. The secure module may be provided to the secure module over a network and may replace existing cryptographic material with the renewed cryptographic material, and a cryptoprocessor of the secure module may be configured to use the renewed cryptographic material for fulfilling requests received from the computing resource.

Figure 12:
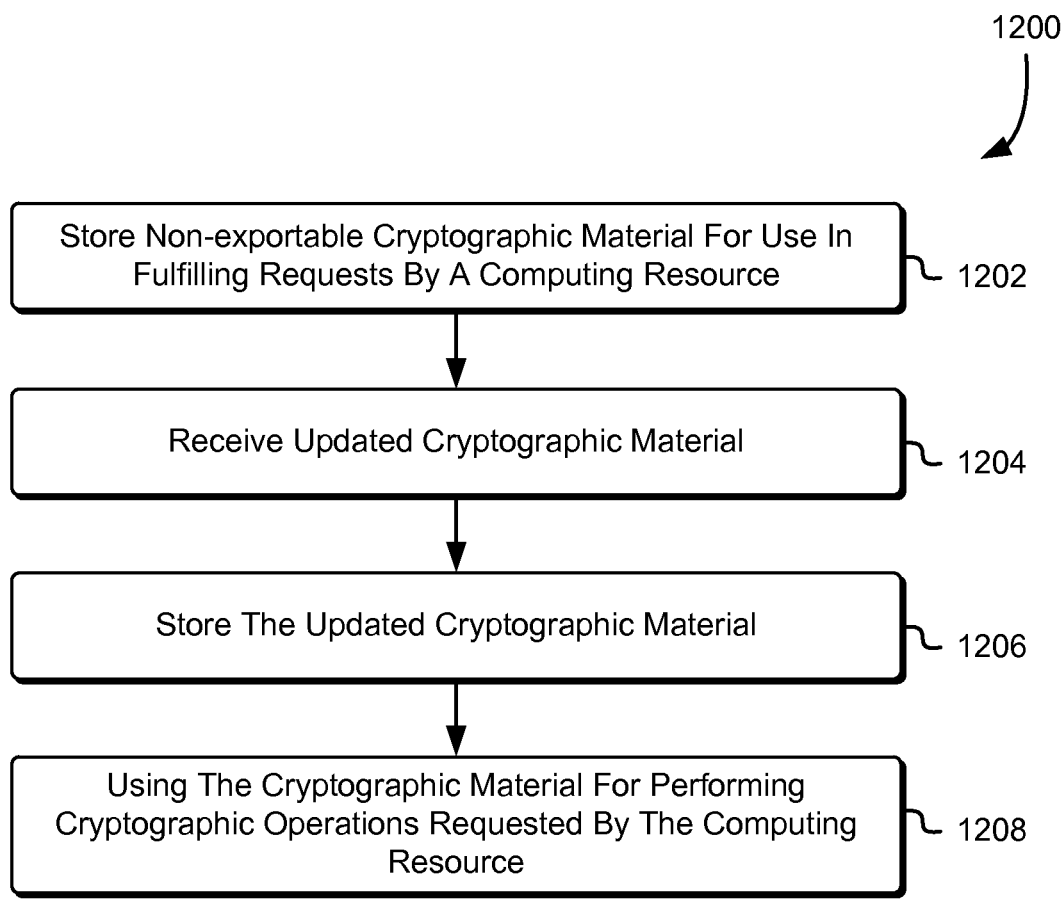
FIG. 12 shows a method for updating cryptographic material stored by a secure module in accordance with at least on embodiment.

FIG. 12 shows a method for updating cryptographic material stored by a secure module in accordance with at least on embodiment. In the process 1200, a secure module, such as the secure module 212 described with reference to FIG. 2, stores 1202 non-exportable cryptographic material for use in fulfilling requests by a computing resource. The secure module then receives 1204 updated cryptographic material. The updated cryptographic material may be received from a cryptographic material renewal entity, such as the cryptographic material renewal entity 1026 described with reference to FIG. 10. The updated cryptographic material may be received by the secure module in order to replace existing cryptographic material, and upon receipt of the cryptographic material, the secure module may be configured to utilize the updated cryptographic material for performing cryptographic operations and fulfilling requests of the computing resource.

The secure module then stores 1206 the updated cryptographic material. Further, the secure module uses 1208 the cryptographic material for performing cryptographic operations requested by a computing resource. Updating the cryptographic material may not be detectable by the associated computing resource and the computing resources may not be notified of the occurrence of an update to the cryptographic material.

Figure 13:
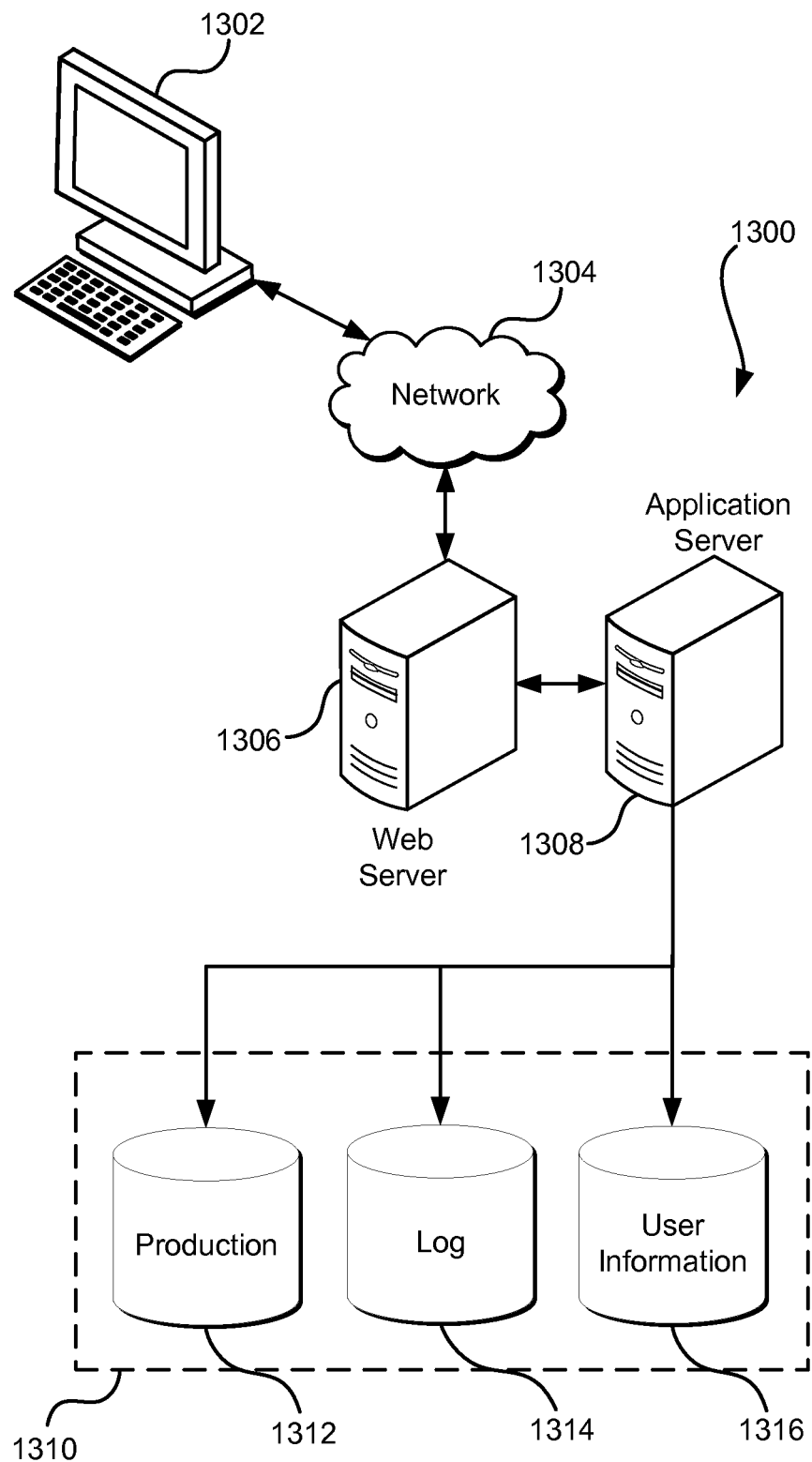
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for renewing cryptographic material, comprising:
   under the control of one or more computer systems configured with executable instructions,
     receiving, from a customer of a plurality of customers of a computing resource service provider, a request to automatically renew cryptographic material made available for use by a virtual computer system provisioned for the customer by the computing resource service provider, the request being made as an application programming interface function call to the computing resource service provider;
     detecting, by a renewal agent of the computing resource service provider, that the cryptographic material made available for use by the virtual computer system is to be renewed, the detecting being based at least in part on the request to automatically renew the cryptographic material and the cryptographic material being stored by a secure module that includes a datastore and an associated cryptoprocessor configured to perform a set of cryptographic operations using the cryptographic material, the secure module logically attached to the virtual computer system;
   obtaining renewed cryptographic material; and
   providing the renewed cryptographic material to the secure module in a manner enabling the virtual computer system to programmatically cause the secure module to use the renewed cryptographic material to perform cryptographic operations, providing the renewed cryptographic material being performed without updating a manner in which the virtual computer system programmatically interacts with the secure module.

2. The computer-implemented method of claim 1, wherein detecting that the cryptographic material is it to be renewed is based at least in part on an expiration of a specified period of time for renewing the cryptographic material.

3. The computer-implemented method of claim 1, wherein the cryptographic material is rekeyed to produce the renewed cryptographic material.

4. A system, comprising at least one computing device configured to implement one or more services, wherein the one or more services are configured to:
   detect, by a cryptographic material renewal entity of a computing resource service provider, that cryptographic material stored by a secure module is to be renewed, the cryptographic material being used to fulfill requests made by a computing resource provisioned by the computing resource service provider for a customer of a plurality of customers of the computing resource service provider, the secure module provisioned by the computing resource service provider and configured with:
     a datastore configured to store the cryptographic material or renewed cryptographic material; and a cryptoprocessor configured to perform one or more cryptographic operations to fulfill further requests made by the computing resource;

obtain renewed cryptographic material to replace the cryptographic material; and provide, over a network, the renewed cryptographic material to the secure module, the renewed cryptographic material being used by the secure module to fulfill further requests made by the computing resource.

5. The system of claim 4, wherein the one or more services are further configured to receive, from the customer of the plurality of customers, a request to automatically renew cryptographic material made available to the computing resource.

6. The system of claim 4, wherein the secure module is a virtual smartcard or virtual trusted platform module.

7. The system of claim 4, wherein the secure module is a network-attached hardware secure module.

8. The system of claim 4, wherein the further requests are application programming interface configured function calls made by the computing resource to the secure module.

9. The system of claim 4, wherein the renewed cryptographic material includes a private key associated with a digital certificate.

10. The system of claim 4, wherein the renewed cryptographic material includes a digital certificate.

11. A non-transitory computer-readable storage medium having stored thereon executable instructions that, when executed by one or more processors of a computer system, cause the computer system to at least:

identify based at least in part on a customer-specified configuration that cryptographic material stored by a secure module is to be renewed, the cryptographic material being made available to a computing resource provisioned by a computing resource service provider for the customer, the secure module logically connected to the computing resource and provisioned by the computing resource service provider;

obtain the renewed cryptographic material; and cause the renewed cryptographic material to be provided to the secure module, after providing the renewed cryptographic material to the secure module, the renewed cryptographic material is used by the secure module for performing cryptographic operations programmatically requested by the computing resource, wherein the instructions that cause the computer system to provide the renewed cryptographic material to the secure module further include instructions that cause the computer system to provide encrypted renewed cryptographic material to the secure module; and the secure module decrypts the encrypted renewed cryptographic material to obtain the renewed cryptographic material.

12. The non-transitory computer-readable storage medium of claim 11, wherein the instructions that cause the computer system to identify that the cryptographic material is to be renewed further include instructions that cause the computer system to identify that the cryptographic material is to be renewed least in part on an expiration of a specified period of time for renewing the cryptographic material.

13. The non-transitory computer-readable storage medium of claim 11, wherein the instructions that cause the computer system to obtain the renewed cryptographic material further include instructions that cause the computer system to cause the cryptographic material to be rekeyed to produce the renewed cryptographic material.

14. The non-transitory computer-readable storage medium of claim 11, wherein the instructions that cause the computer system to obtain the renewed cryptographic material further include instructions that cause the computer system to send, to a certificate authority, a request to generate the renewed cryptographic material and receive the renewed cryptographic material from the certificate authority in response to the request.

15. The non-transitory computer-readable storage medium of claim 11, wherein the secure module is logically attached to the computing resource.

16. The non-transitory computer-readable storage medium of claim 15, wherein the computing resource is configured with a driver that detects logical attachment of the security module.

17. The non-transitory computer-readable storage medium of claim 11, wherein the customer-specified configuration indicates that the cryptographic material is to be renewed periodically or based at least in part on a schedule.

\* \* \* \* \*